US009667445B2

(12) United States Patent
Eskicioglu et al.

(10) Patent No.: US 9,667,445 B2
(45) Date of Patent: May 30, 2017

(54) SIGNALING PLANE DELAY KPI MONITORING IN LIVE NETWORK

(75) Inventors: Suat R. Eskicioglu, Ottawa (CA); Nausheen Naz, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1022 days.

(21) Appl. No.: 13/217,809

(22) Filed: Aug. 25, 2011

(65) Prior Publication Data
US 2013/0054778 A1 Feb. 28, 2013

(51) Int. Cl.
*G06F 15/173* (2006.01)
*H04L 12/64* (2006.01)
*H04W 24/06* (2009.01)

(52) U.S. Cl.
CPC ......... *H04L 12/6418* (2013.01); *H04W 24/06* (2013.01)

(58) Field of Classification Search
CPC .................... H04L 12/6418; H04W 24/06
See application file for complete search history.

(56) References Cited

U.S. PATENT DOCUMENTS

| | | | | |
|---|---|---|---|---|
| 6,388,997 B1* | 5/2002 | Scott | | 370/280 |
| 7,394,770 B2* | 7/2008 | Bennett et al. | | 370/252 |
| 7,796,526 B2* | 9/2010 | Miller | | H04L 12/2697 370/241 |
| 7,987,257 B1* | 7/2011 | Stewart | | H04L 41/5003 709/223 |
| 8,543,066 B2* | 9/2013 | Marklund | | H04B 17/23 370/252 |
| 8,699,359 B2* | 4/2014 | Eskicioglu | | H04L 43/0852 370/249 |
| 8,949,444 B1* | 2/2015 | Ma | | H04L 47/10 709/228 |
| 9,008,682 B2* | 4/2015 | Malomsoky | | H04W 24/08 455/420 |
| 2005/0097209 A1* | 5/2005 | McDonagh | | H04L 12/2602 709/224 |
| 2006/0153091 A1* | 7/2006 | Lin | | H04L 43/0858 370/252 |
| 2009/0131022 A1* | 5/2009 | Buckley et al. | | 455/412.1 |
| 2010/0094990 A1* | 4/2010 | Ben-Yehuda | | G06F 11/3409 709/224 |
| 2010/0195496 A1* | 8/2010 | Holm-Oste | | H04L 41/507 370/232 |
| 2011/0267952 A1* | 11/2011 | Ko | | H04L 43/0864 370/237 |
| 2012/0106355 A1* | 5/2012 | Ludwig | | H04L 47/10 370/241 |
| 2013/0070612 A1* | 3/2013 | Timus | | H04W 24/02 370/241.1 |
| 2013/0322255 A1* | 12/2013 | Dillon | | H04L 47/22 370/236 |
| 2014/0098679 A1* | 4/2014 | Baillargeon | | H04L 43/08 370/251 |
| 2016/0226742 A1* | 8/2016 | Apathotharanan | | H04L 43/12 |

* cited by examiner

*Primary Examiner* — Mohamed Wasel
(74) *Attorney, Agent, or Firm* — Kramer & Associates, P.C.

(57) ABSTRACT

Embodiments of the invention are directed to providing a method for measuring signaling plane delay in a communication network using a probe session indicator to trigger logging of timestamps at network elements for centralized analysis at a network monitor system.

20 Claims, 7 Drawing Sheets

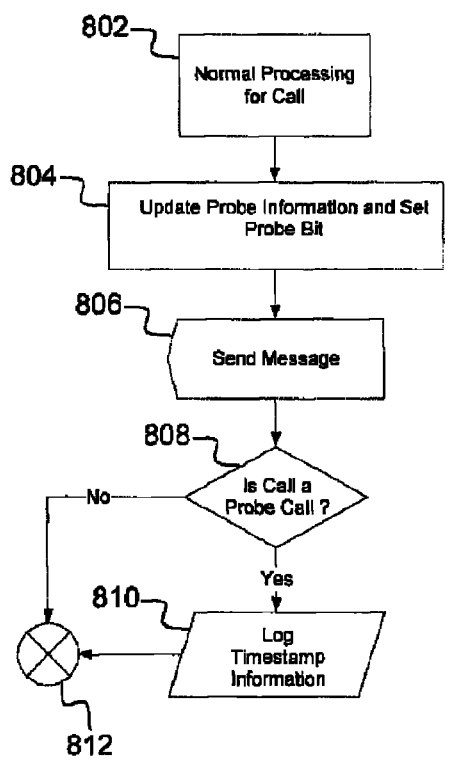
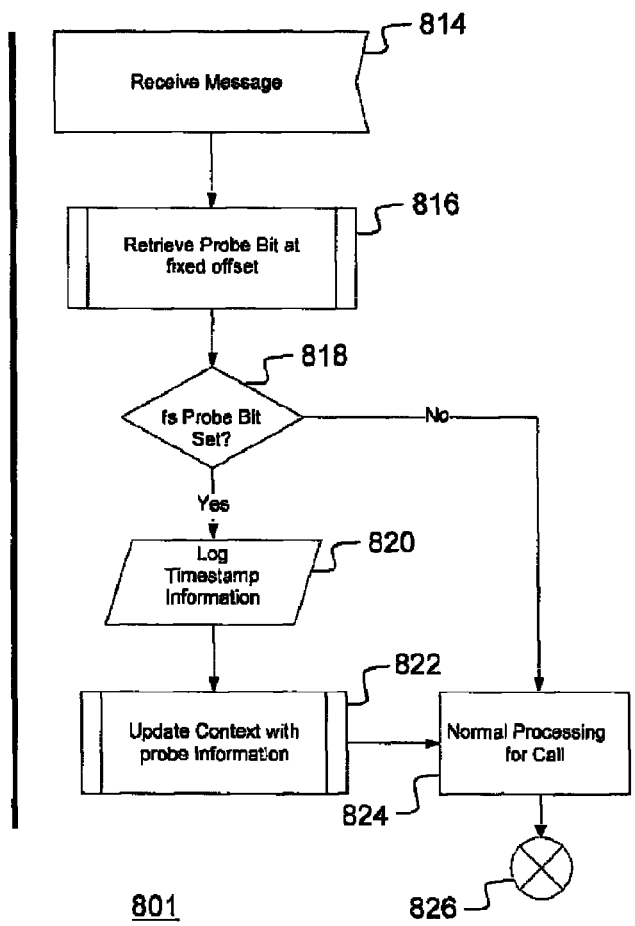
FIG. 8a
FIG. 8b

SIGNALING PLANE DELAY KPI MONITORING IN LIVE NETWORK

FIELD OF THE INVENTION

The invention is directed to communication networks, and particularly to measuring performance indicators in communication networks.

BACKGROUND OF THE INVENTION

The quality of end user experience in the Wireless Networks is important for the network operators because it is one of the elements that attracts and keeps subscribers and builds customer loyalty. For that reason, wireless network operators track network performance indicators and demand from telecommunications equipment vendors that certain performance criteria are met to satisfy a level of quality of the end user experience. Various metrics to measure the performance of the network are generally referred to as Key Performance Indicators (KPI). One of these performance indicators is network latency.

There are currently many methods and ubiquitous tools to measure the end-to-end latency in commercial communications networks, which are suitable either to confirm good results or to point out an issue in the network, but it is more difficult to track the contribution of each network element and end user equipment on the network latency in order to determine the source of latency problems. Typically, external network analyzers or test equipment are required to be inserted at each of the external interfaces in the network in order to determine the source of latency problems, which is not cost effective for live networks. FIG. 1 illustrates a simplified UMTS (Universal Mobile Telecommunications System) network 100, having network elements RNC (Radio Network Controller) 102, SGSN (Serving GPRS Support Node) 104, NodeB (base station transceiver 106, UE (User Equipment) 108, all supervised by a Network Monitoring system 110. Physical connections are represented by solid lines between network elements, and application layer connections are represented by dashed lines between network elements. Network protocol Analyzers 112A, 112B, 112C are installed at the interfaces between these nodes in order to capture message packets and log the time at which they are captured. In real telecommunications networks with hundreds of nodes and thousands of users, this becomes very impractical. Additionally, network analyzers intercept packets and if these packets are encrypted then decoding is not possible unless an encryption key is provided to the network analyzer which is typically not desirable for security reasons.

In view of the foregoing, it would be desirable to provide a method of measuring signaling plane delay Key Performance Indicators in network elements of a live network while minimizing impact on system performance.

SUMMARY OF THE INVENTION

In general terms, embodiments of the invention are to set up a call which has the capability of collecting delay information from each node and report back to a network management system or a network monitoring center. This is similar to a KPI self-tracking functionality, where once activated, network operators will have the ability to measure not only end-to-end latency but also latencies within each network element.

According to one aspect of the invention, there is disclosed a method at a network element for measuring signaling plane delay in a communication network. The method comprises steps of: receiving a message at said network element; determining if the received message contains a probe session indicator; and responsive to determining receipt of said probe session indicator, logging at said network element, a timestamp for receipt of said probe session indicator along with an associated identifier for said probe session.

In some embodiments of the invention the receipt of said probe session indicator is determined in an application layer of said network element.

In some embodiments of the invention the indicator comprises an International Mobile Subscriber Identity (IMSI) identifying a probe session.

Some embodiments of the invention further comprise a step of enabling said determining step responsive to receiving a broadcast message with said probe IMSI.

Some embodiments of the invention further comprise a step of enabling said determining step responsive to receiving a message with a probe bit set.

In some embodiments of the invention the probe session indicator comprises a probe bit identifying a probe session.

In some embodiments of the invention the probe bit comprises a bit in a message header.

In some embodiments of the invention the receipt of said probe session indicator is determined in a hardware layer of said network element.

Some embodiments of the invention further comprise a step of transmitting said timestamp and associated identifier for said probe session, to a network monitoring system.

Some embodiments of the invention further comprise steps of: determining that an outgoing message is associated with said probe session; transmitting from said network element said outgoing message associated with said probe session; and logging at said network element, a timestamp for transmission of said outgoing message along with said associated identifier for said probe session.

According to another aspect of the invention, there is disclosed a tangible and non-transitory machine-readable storage medium encoded with instructions thereon for execution by a network element of a telecommunication network, wherein the instructions configure the operation of the network element to perform a method. The method comprises steps of: receiving a message at said network element; determining if the received message contains a probe session indicator; and responsive to determining receipt of said probe session indicator, logging at said network element, a timestamp for receipt of said probe session indicator along with an associated identifier for said probe session.

Advantageously, embodiments of the invention can be used to provide timestamps of probe sessions along with associated probe session identifiers to a network management system for analysis by the network management system to determine signaling plane delay and the contribution individual network elements to the signaling plane delay of the network.

BRIEF DESCRIPTION OF THE DRAWINGS

Some embodiments of apparatus and/or methods in accordance with embodiments of the present invention are now described, by way of example only, and with reference to the accompanying drawings in which:

FIG. 8a, 8b illustrate flow chart of probe session messaging according to a third embodiment of the present invention.

In the figures, like features are denoted by like reference characters.

DETAILED DESCRIPTION

The following description focuses on the Signaling Plane Delay Key Performance Indicator (KPI). Signaling Plane Delay KPI measures or monitors the response time in setting up a service for an end user. It is relatively straight forward to measure the total latency for any given user and for any given service on a network, it has been heretofore prohibitively expensive to determine the apportionment of this total delay, since many network elements, end user equipment and transport network elements contribute to this delay. When the end-to-end delay is within the expected range, there is no need to know which of the elements are contributing how much to the total latency, but when the measured end-to-end latency is higher than the expected value, it is important to know which elements in the network are contributing to the excess delay in order to take appropriate remedial action to resolve the problem.

Examples of Signaling Plane Delay include the delay endured by a User Equipment (UE) to setup a Radio Resource Control (RRC) connection in a Universal Mobile Telecommunications System (UMTS) network, or the procedure delay in adding or deleting the radio links during hand-off procedures when a UE moves between radio cells.

In telecommunications networks, signaling plane messages are transmitted from a first node to a second node to establish services. In some cases, these messages are relayed via one or more intermediate nodes. In other cases, receipt of a first message at a node triggers transmission of a related message in a message sequence to set up a service or perform some other function in the network. Signaling plane messages take a finite time to traverse each node, referred to as signaling plane delay. In order to monitor or measure a signaling plane delay KPI, it is useful to determine the time when the message arrives and leaves strategic trace points in the network. Typically it is useful to record a timestamp at reception of a message and record another timestamp upon forwarding the message to a subsequent node or upon transmission of a related message in a message sequence. The difference between send time and receive time gives the message delay incurred at a particular node.

Measuring this message delay is conceptually quite simple but presents challenges in implementation. When a message arrives at a network element or node, it actually arrives at the hardware layer, where there is not yet knowledge of message type or call type, which is determined by parsing of the message which is typically performed in software. Trace points at the hardware layer is CPU intensive because logging of time stamps would need to be performed for every message. This would also result in complex post-processing scripts as well, in order to handle the very large number of resulting timestamps to sort and analyze.

Figure 1:
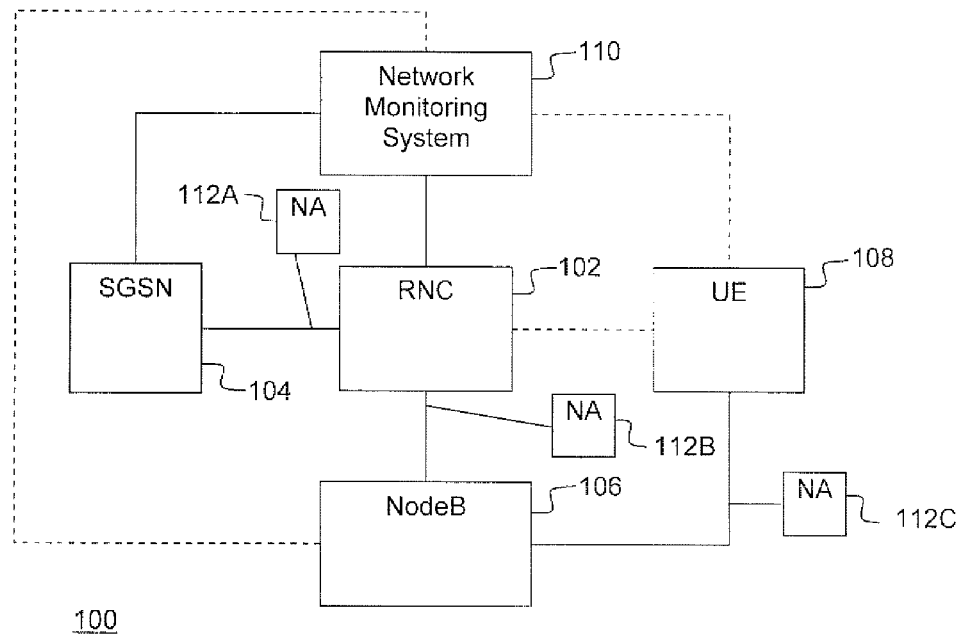
FIG. 1 illustrates a simplified UMTS network with external network analyzers for determining the source of network latency according to the prior art.
Figure 2:
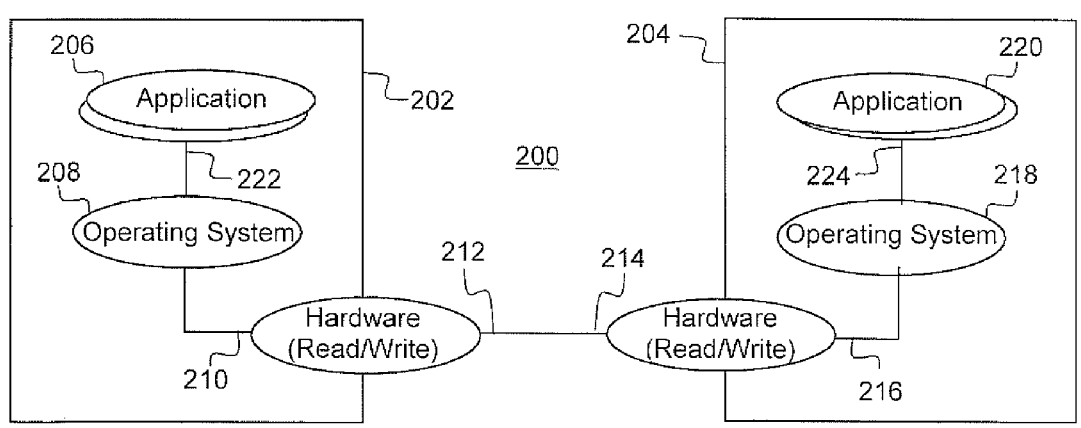
FIG. 2 illustrates message flow between network elements.

FIG. 2 illustrates message flow between two nodes 202, 204 of network 200. Typically, in prior art systems, Platform delay is measured from point 208 to point 212 on node 202 and between point 218 to point 214 on node 204. It is difficult from a practical point of view to measure without any performance impact a packet leaving point 212 because point 212 is common to all messages within node 202 and therefore requires timestamping all packets received at or transmitted from node 202.

Using trace points in a software application layer can potentially introduce some additional processing delay and cause some minor loss of accuracy. In order to perform latency measurements while minimizing impact to system performance, it is possible to divide the delay into:

1. Platform Delay (Operating System and Hardware layer): the delay between two interacting applications sending/receiving a message, such as between point 222 and point 224.
2. Application Delay (Application layer): the time spent by a message inside the application module. That is the duration for which applications receives a request and send the response back A proposed solution includes setting trace points at points 222 and 224, above the hardware layer 210, 216 and just below the Application layer 206, 220 to track incoming and outgoing messages on all nodes or network elements 202, 204. At this point the message type and message identifier can be determined so that time-stamping of messages and resulting KPI monitoring can be restricted to specific messages or calls.

In order to select which messages to monitor, a probe session or probe call is defined. Thus, when a network operator wishes to monitor signaling plane delay in a communication network, the network operator initiates a probe session having a probe session indicator. Signaling plane messages are propagated through various network elements during the regular process of setting up a session. At each of the network elements, the signaling plane messages for this probe session are detected and for these messages only, the time of receiving the message is recorded thereby creating a timestamp, and the time stamp and the associated probe session identifier are logged at the respective network element. The logged timestamps and identifiers are then forwarded to a network management system preferably with an identifier of the network element. The network management system sorts the timestamps and calculates signaling plane delays across each network element. Thus embodiments of the present invention collect and forward timestamp information to a network management system to facilitate the network management system to calculate signaling plane KPIs.

Application layer messages are parsed to determine if they are associated with a probe session indicator and if they are, a time stamp is recorded, capturing the time at which the message is determined to be received at the network element. In this manner, only a small subset of signaling plane messages are time-stamped and logged, which minimizes degradation in network performance.

Figure 3:
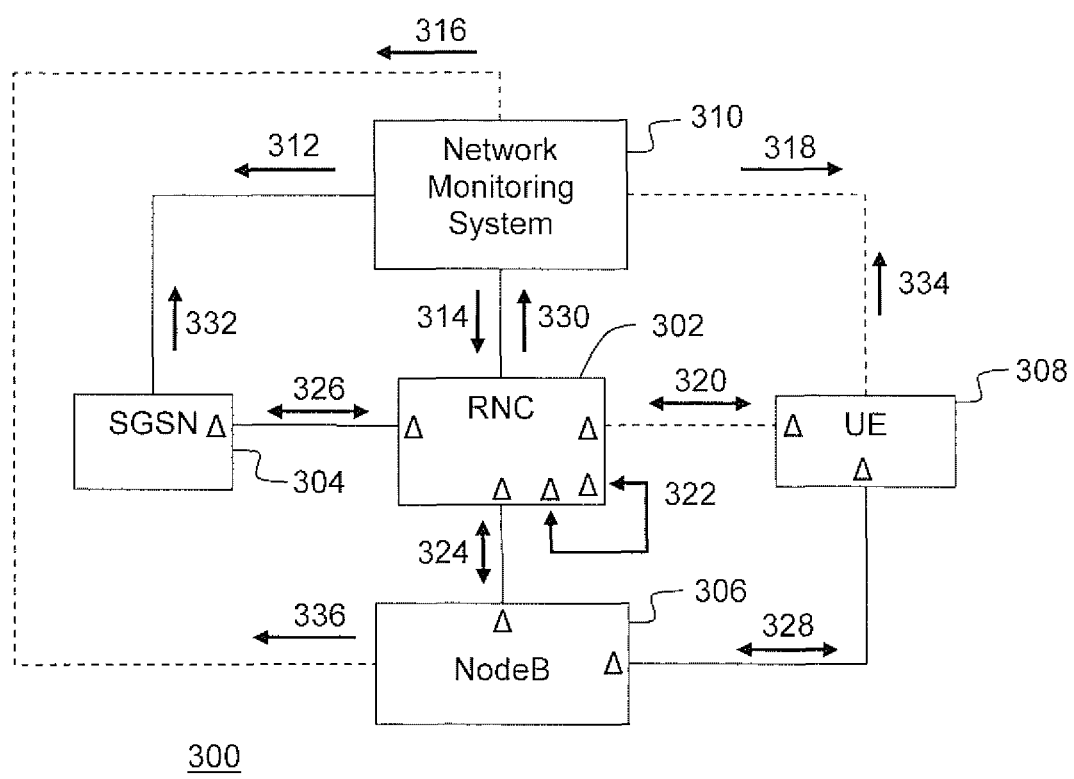
FIG. 3 illustrates probe session messaging in a network according to a first embodiment of the present invention.

In a first embodiment of the present invention, a probe session is defined by a predetermined specific user identifier such as an International Mobile Subscriber Identity (IMSI). Networks elements are configured with a specific user identifier labeled as a probe session identifier. In FIG. 3, physical connections are represented by solid lines between network elements and application layer connections are represented by dashed lines between network elements. Network monitoring system 310 within network 300 broadcasts a message 312, 314, 316, 318 to all network elements 302, 304, 306, 308, identifying a specific IMSI identifier as a probe session identifier which is then stored by each network element for future reference. The network elements 302, 304, 306, 308 are now configured to compare the IMSI value of incoming messages against the stored probe session IMSI.

When it is desired to measure signaling plane delays in the network 300, a session is set up using the probe session identifier. The session can include setting up any of a variety of different services including a call. As signaling messages 320, 322, 324, 326, 328 are received at each network element 302, 304, 306, 308, enabled by the broadcast message, each network element parses the incoming message to read the IMSI and compares the IMSI of the message to the specified probe session identifier to determine if they match and if so then the message is tagged as a probe session message and the time of receipt of the message is measured and stored as a timestamp at the network element along with the IMSI identifier for the probe session. Note that the time of receipt of the message is more accurately characterized as the time at which the message has been identified as containing an IMSI probe session identifier. The points where send or receive timestamps are recorded are indicated by "Δ". The stored timestamps and associated session identifiers are subsequently forwarded by each network element as messages 330, 332, 334, 336 to the network monitoring system 310 for further processing.

Figure 4A:
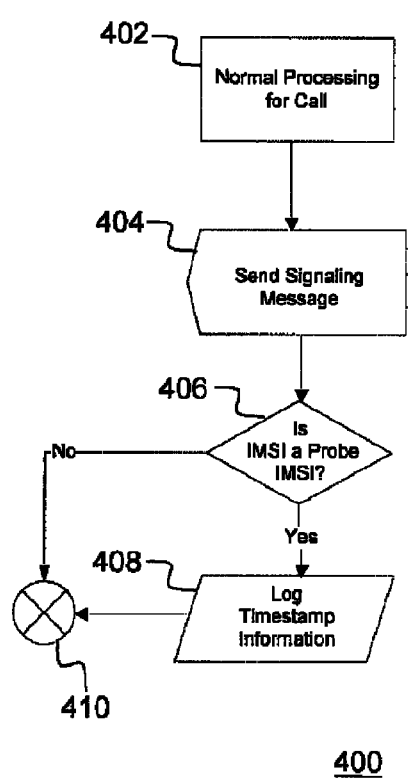
FIG. 4a, 4b illustrate flow chart of probe session messaging according to a first embodiment of the present invention.

FIG. 4a illustrates a flowchart for transmitting signaling messages from network elements according to a first embodiment of the present invention. As signaling messages are processed for transmission from each of network elements 302, 304, 306, 308, normal call processing takes place (step 402). After a signaling message is transmitted (step 404), the network element then determines at step 406 if the IMSI associated with the message matches an IMSI associated with a probe session and if so, at step 408, the network element logs timestamp information by calculating and then saving or recording the time of transmission of the signaling message. If the IMSI is not associated with a probe session, the process stops at step 410.

Figure 4B:
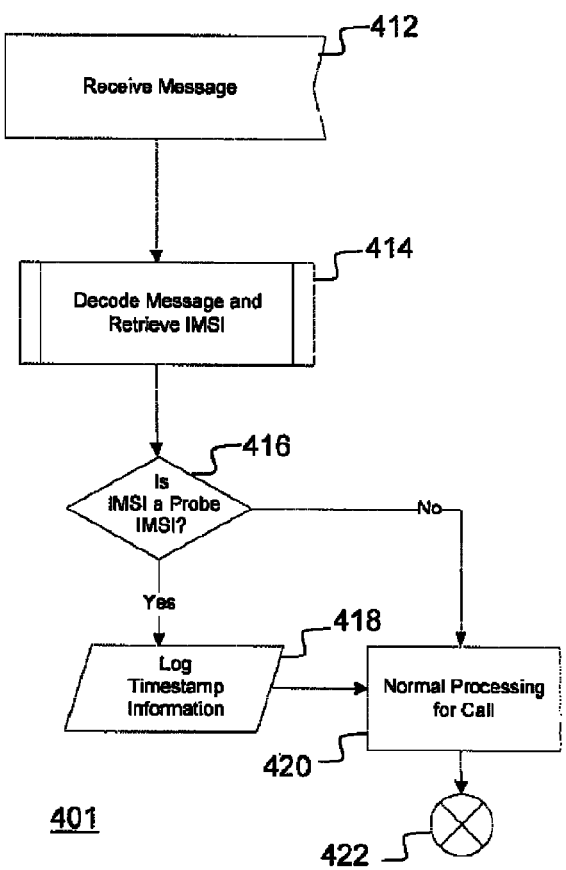

FIG. 4b illustrates a flowchart for receiving signaling messages at network elements according to a first embodiment of the present invention. The process starts at step 412 where a signaling message is received at a network element. At step 414, the network element decodes or parses the signaling message to retrieve the IMSI or other session identifier for the message. At step 416, the network element determines if the IMSI is associated with a probe session and if so, the network element logs timestamp information by calculating and then saving or recording the time of reception of the signaling message. The process then proceeds to step 420 where normal call processing continues and the process ends at step 422. If the network element determines at step 416 that the IMSI is not associated with a probe session, the process proceeds to step 420.

Each outgoing signaling message from each network element is similarly parsed to determine if it contains an IMSI defined as a probe session IMSI and if so, the transmit time of the outgoing message is measured and stored as a timestamp at the network element along with the IMSI identifier for the message. The stored timestamps and associated session identifiers are subsequently forwarded by each network element to the network monitoring system 310 where the time stamps for incoming messages and outgoing messages and their respective associated session identifiers at each network element are sorted and analyzed to calculate signaling plane delay across the various network elements in the network.

Note that signaling messages can be transmitted directly from one network element to another network element or forwarded through one or more intermediate nodes to a destination node. In either case when an outgoing message is prepared for transmission at each network element, it is parsed to determine the IMSI and compared to the predefined probe session identifier as described above.

As additional messages related to the same session, (i.e.: having the same IMSI) are generated by the network elements as part of the standard signaling sequence, they are also parsed to determine the IMSI and compared to the predefined probe session identifier as described above.

Note that more than one probe session IMSI can be defined at one time on a network element, thus IMSI values of signaling messages can be compared to a single predefined probe session identifier or against a list of predefined probe session identifiers to determine if the signaling message is associated with a probe session.

Figure 5:
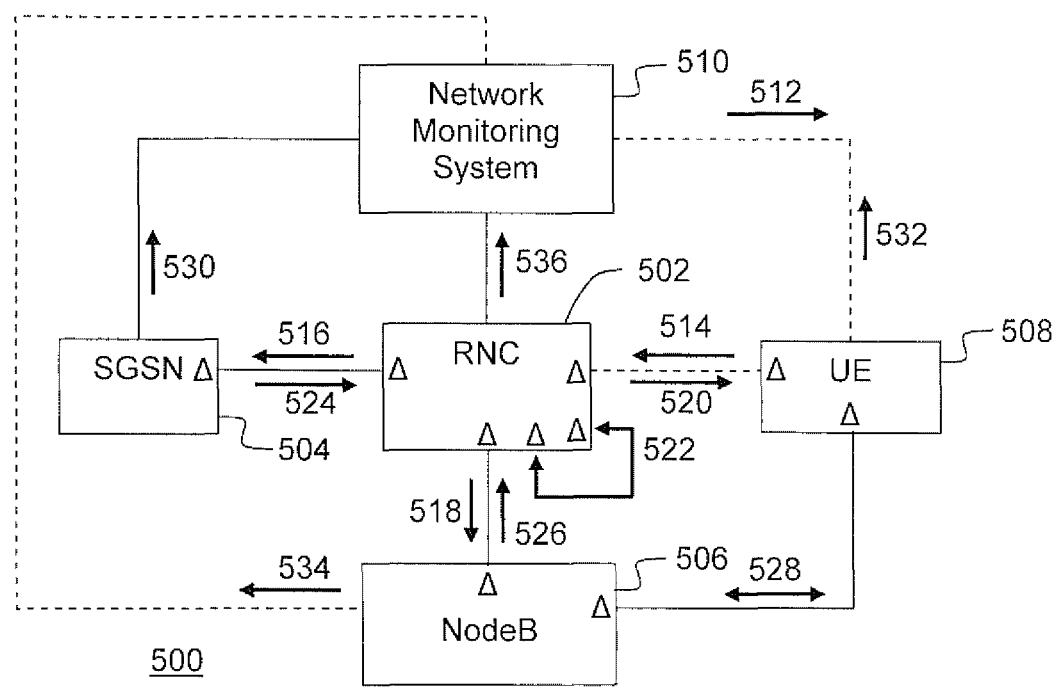
FIG. 5 illustrates probe session messaging in a network according to a second embodiment of the present invention.

Alternatively, in a second embodiment of the present invention, a User Equipment sets a specific bit within a signaling message to indicate a probe session to other network elements in the network. With reference to FIG. 5, network monitoring system 510 within network 500 transmits signaling message 512 with an IMSI identifying a specific User Equipment (UE) to UE 508, instructing UE 508 to enable a probe session indicator bit in subsequent signaling messages from UE 508.

Subsequently, when UE 508 sends signaling messages, such as for setting up a call or establishing a service, UE 508 sets a bit in the header of the signaling message 514 indicating that the message is related to a probe session. The probe session indicator bit is then propagated in related messages 516, 518, 520, 522, 524, 526, 528 to other network elements 502, 504, 506, 508 in network 500.

For example, in a UMTS network, a call setup initiated by UE 508 starts with RRC connection request message 514 from UE 508 to RNC 502. RRC Connection Request message 514 has an optional Information Element (IE) for probe indication, which will be set by the UE 508. RNC 502, upon receiving message 514 stores the information about probe in the context for the call and communicates it to SGSN 504 via signaling message 516. In this scheme, NodeB 506 receives the probe information via NBAP RL setup request message 518. Thus the network elements in network 500 receive signaling messages with the probe session bit in the signaling message header, store the probe information in the call context and pass it on upon first interaction to other interacting nodes. When network elements 502, 504, 506, 508 send or receive signaling messages with the probe session bit set, the network elements measure and store the time of receipt or transmission respectively, of the message as a timestamp at the network element along with an identifier for the probe session. The stored timestamps and associated probe session identifiers are subsequently forwarded by each network element as messages 530, 532, 534, 536 to the network monitoring system 510 for further processing.

Figure 6A:
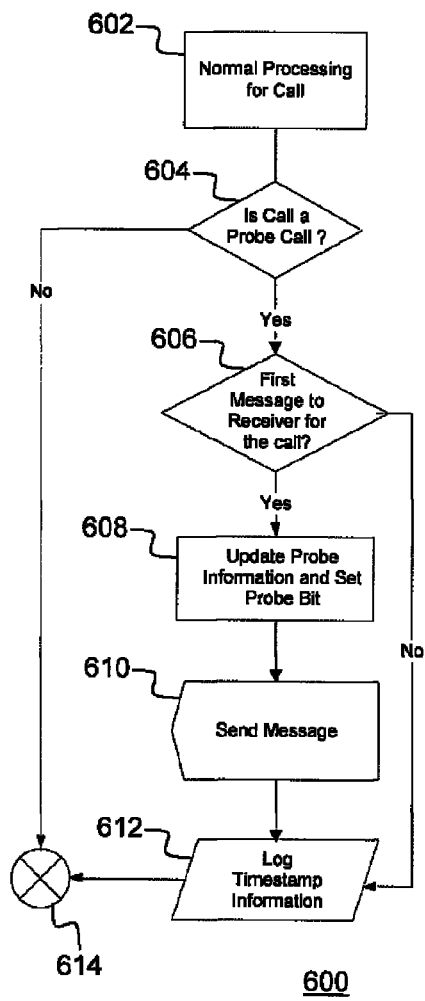
FIG. 6a, 6b illustrate flow chart of probe session messaging according to a second embodiment of the present invention.
Figure 6B:
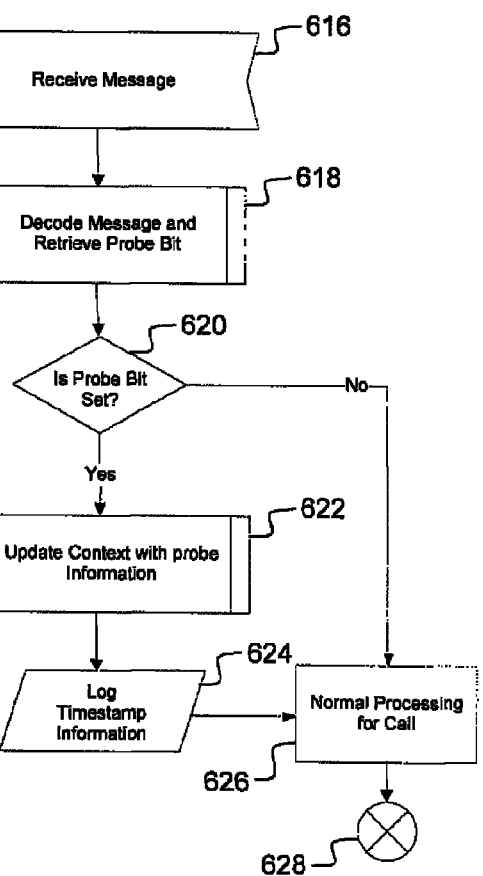

FIG. 6a illustrates a flowchart for transmitting signaling messages from network elements according to a second embodiment of the present invention. Note that the steps of process of FIG. 6A and FIG. 6B are preceded by UE 508 receiving message 512 and UE 508 setting a bit in the header of the signaling message 514, as previously described. As signaling messages are processed for transmission from UE 508, normal call processing takes place (step 602). The following steps are then applicable to any of Network Elements 502, 504, 506 and 508. At step 604, the Network Element determines if a signaling message is associated with a probe session or probe call and if not the process ends at step 614. If the signaling message being processed is associated with a probe session or probe call then at step 606, the Network Element determines if this signaling message is the first message related to this session or call and if so, at step 608 the Network Element updates the probe information and encodes the outgoing message by setting a probe session bit in the signaling message header. At step 610 the Network Element transmits the message to the destination network element (502, 504, 506) and at step 612 the Network Element logs timestamp information by calculating and then saving or recording the time of transmission of the signaling message. The process then ends at step 614. In this second embodiment of the invention, UE 508 is advised of a probe session by Network Monitoring System 510 via message 512 containing an IMSI associated with a probe session. UE 508 subsequently conveys the probe session information to other network elements via a probe session bit set in the signaling message header. The process for transmitting signaling messages and logging time stamps from other network elements is controlled by a probe session bit.

FIG. 6b illustrates a flowchart for receiving signaling messages at a User Equipment 508 according to a second embodiment of the present invention. At step 616, UE 508 receives a signaling message. At step 618 UE 508 decodes the signaling message and retrieves the probe session bit from the message header. At step 620, UE 508 determines if the probe session bit is set and if so, it updates the session context (call context) with the probe information at step 622. At step 624, UE 508 the logs timestamp information by calculating and then saving or recording the time of reception of the signaling message. The process then proceeds to step 626 where normal call processing continues and the process ends at step 628. If the network element determines at step 620 that the bit is not set, the process proceeds to step 626. The process of FIG. 6b also applies to other network elements (502, 504, 506) of network 500.

Note that signaling messages for which a probe session indicator bit is not set will be processed as normal with no time-stamping, thus the time-stamping activity of this embodiment can be activated only as required to minimize overhead cost in CPU usage for the network elements.

The specific bit indicating a probe session can be implemented in various ways including defining a probe session bit at a specific offset from the beginning of the signaling message. This can be defined, for example as a specific bit within the message header of a signaling message, such as using a spare bit that is has heretofore not been defined in a signaling standard. For example, in a UMTS network, RRC, NBAP, RNSAP and RANAP protocols have MSG Code as the message header and then other IE (information elements) depending on the protocol. The probe bit or probe indicator can be part of this header. Advantageously, using a probe session indicator bit at a specific location in a signaling message facilitates a hardware implementation of testing a message for a probe session indicator at a network element and also calculating a timestamp for signaling messages. This in turn reduces CPU usage when compared to a software implementation.

In a third embodiment of the present invention, a probe session indicator bit is used in all signaling messages used in the network in order to simplify implementation.

Figure 7:
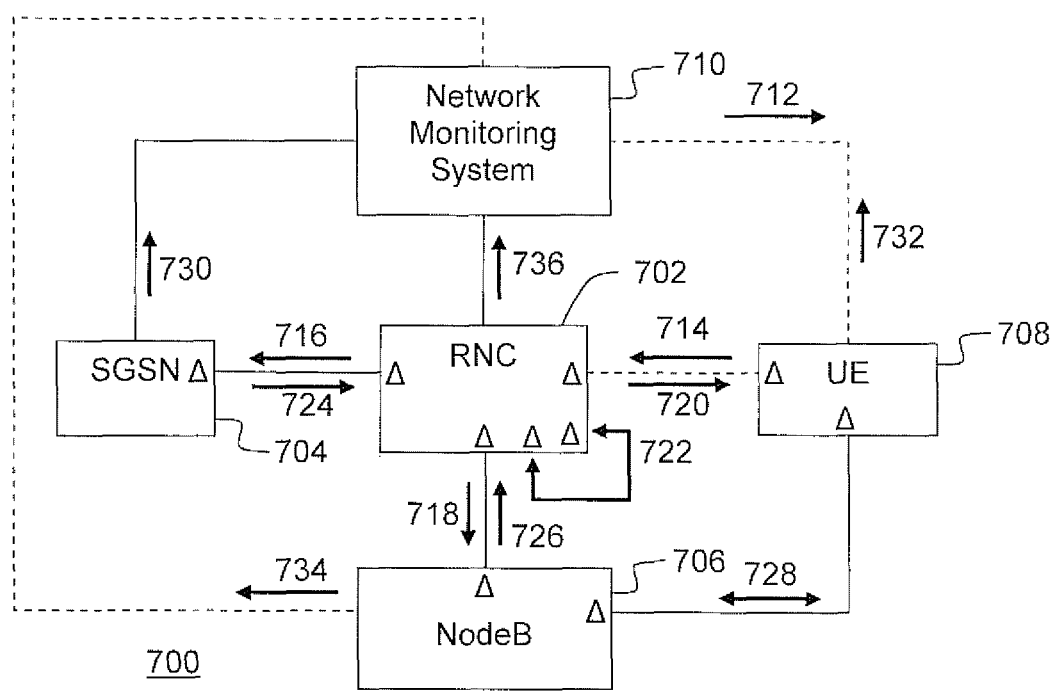
FIG. 7 illustrates probe session messaging in a network according to a third embodiment of the present invention.

With reference to FIG. 7, a network operator through Network Monitoring System 710 instructs UE 708 to enable probing on subsequent session set-ups by transmitting signaling message 712 with a probe session indicator bit set in the header of the signaling message 712.

When UE 708 sends the first message 714 to set up a session such as a call, the UE 708 will check if probe session indicator bit needs to be set and if yes, it sets the probe session indicator bit in the signaling message 714 and sends the message. The probe session indicator bit is then propagated in related messages 716, 718, 720, 722, 724, 726, 728 to and from network elements 702, 704, 706, 708 in network 700. As the signaling messages are received and transmitted by network elements, each network element checks the probe session indicator bit, records a timestamp of the time the message is received or transmitted as well as related information such a session identifier such as the IMSI of the calling UE and updates the call context based on the probe session indicator bit. When the signaling message is forwarded to another network element or if the same message is not forwarded but instead, a related message is sent as part of a session set-up message sequence, the network element retrieves the call context information including the probe session indicator bit value and sets the probe session indicator bit in the outgoing message appropriately and logs the timestamp for the sending the outgoing message along with the associated information for the call or session. The stored timestamps and associated probe session identifiers are subsequently forwarded by each network element as messages 728, 730, 732, 734, 736 to the network monitoring system 710 for further processing.

FIG. 8a illustrates a flowchart for transmitting signaling messages from a network element according to a third embodiment of the present invention. As signaling messages are processed for transmission from each of network elements 702, 704, 706, 708, normal call processing takes place (step 802). At step 804 the network element updates the probe information and encodes the outgoing message by setting a probe session bit in the signaling message header. At step 806 the network element transmits the message to a destination network element. A step 808 the network element determines if the session or call is a probe session or call and if so at step 810 the network element logs timestamp information by calculating and then saving or recording the time of transmission of the signaling message. The process then ends at step 812. If at step 808 the network element determines that a probe bit is not set then the process ends at step 812.

FIG. 8b illustrates a flowchart for receiving signaling messages at each of network elements 702, 704, 706, 708 according to a third embodiment of the present invention. At step 814 the network element receives a signaling message. At step 816 the network element retrieves the probe session bit from the message header. If the probe session bit is implemented at a fixed offset from the start of a signaling message then this step can be easily implemented in hardware as would be appreciated by persons skilled in the art. At step 818, the network element determines if the probe session bit is set and if so, at step 820 it logs timestamp information by calculating and then saving or recording the time of reception of the signaling message. At step 822 the network element updates the session context (call context) with the probe information. The process then proceeds to step 824 where normal call processing continues and the process ends at step 828. If the network element determines at step 818 that the probe bit is not set, the process proceeds to step 824.

As previously discussed with respect to the second embodiment, defining the probe session indicator bit in a message header advantageously enables simplified implementation.

For example, the UMTS standard uses a field for message type (MsgType) in all protocols (e.g. NBAP, RANAP, RNSAP, RRC). To provide backward compatibility for previous UE releases, the most significant bit (MSB) of message type Information Element (IE) can be used. For upcoming UE releases another embodiment can add a probe bit indicator at the start of the message such as for example, a dedicated bit or byte in a message header.

The preceding description describes steps for efficient embodiments for collecting timestamp information at network elements throughout a network, related to a session such as a call or a service. The timestamp information logged at each network element is then forwarded to a network monitoring system for processing and analysis to calculate signaling plane delay KPI information as would be clear to persons skilled in the art.

Note that it is desirable that all network elements are synchronized to a common clock, to be able to accurately determine platform delay from the relative time between timestamps measured at two different network elements.

The timestamps and associated information logged at each network element can be stored in memory at each network element for the duration of the probe session or probe call. A low priority periodic task then sends the logged information to a network monitoring system. NMS when NE is less busy.

Alternatively, the time stamp information for each received and transmitted signaling message can be sent to the network monitoring system as they are logged.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method at a network element for measuring signaling plane delay in a communication network, the method comprising:
   receiving a message at said network element;
   determining if the received message contains a probe session indicator; and
   only when the received message contains the probe session indicator, logging the received message at the network element and adding a timestamp to the received message, and otherwise not adding the timestamp.

2. The method of claim 1, wherein said receipt of said probe session indicator is determined in an application layer of said network element.

3. The method of claim 2, wherein said indicator comprises an International Mobile Subscriber Identity (IMSI) identifying a probe session.

4. The method of claim 3, further comprising:
   enabling said determining step responsive to receiving a broadcast message with said probe IMSI.

5. The method of claim 3, further comprising:
   enabling said determining step responsive to receiving a message with a probe bit set.

6. The method of claim 1, wherein said probe session indicator comprises a probe bit identifying a probe session.

7. The method of claim 6, wherein said probe bit comprises a bit in a message header.

8. The method of claim 6, further comprising:
determining said receipt of said probe session indicator in a hardware layer of said network element.

9. The method of claim 1, further comprising:
transmitting said timestamp and associated identifier for said probe session, to a network monitoring system.

10. The method of claim 1, further comprising:
determining that an outgoing message is associated with said probe session;
transmitting from said network element said outgoing message associated with said probe session; and
logging at said network element, a timestamp for transmission of said outgoing message along with said associated identifier for said probe session.

11. A tangible and non-transitory machine-readable storage medium encoded with instructions thereon for execution by a network element of a telecommunication network, wherein said instructions configure the operation of said network element to perform a method, the method comprising:
receiving a message at said network element;
determining if the received message contains a probe session indicator; and
only when the received message contains the probe session indicator, logging the received message at the network element and adding a timestamp to the received message, and otherwise not adding the timestamp.

12. The tangible and non-transitory machine-readable storage medium claimed in claim 11, wherein said instructions configure the operation of said network element such that said receipt of said probe session indicator is determined in an application layer of said network element.

13. The tangible and non-transitory machine-readable storage medium claimed in claim 12, wherein said instructions configure the operation of said network element such that said indicator comprises an International Mobile Subscriber Identity (IMSI) identifying a probe session.

14. The tangible and non-transitory machine-readable storage medium claimed in claim 13, wherein said instructions configure the operation of said network element such that said method further comprises a step of enabling said determining step responsive to receiving a broadcast message with said probe IMSI.

15. The tangible and non-transitory machine-readable storage medium claimed in claim 13, wherein said instructions configure the operation of said network element such that said method further comprises a step of enabling said determining step responsive to receiving a message with a probe bit set.

16. The tangible and non-transitory machine-readable storage medium claimed in claim 11, wherein said instructions configure the operation of said network element such that said indicator comprises a probe bit identifying a probe session.

17. The tangible and non-transitory machine-readable storage medium claimed in claim 16, wherein said instructions configure the operation of said network element such that said probe bit comprises a bit in a message header.

18. The tangible and non-transitory machine-readable storage medium claimed in claim 16, wherein said instructions configure the operation of said network element such that said receipt of said probe session indicator is determined in a hardware layer of said network element.

19. The tangible and non-transitory machine-readable storage medium claimed in claim 11, wherein said instructions configure the operation of said network element such that said method further comprises a step of transmitting said timestamp and associated identifier for said probe session, to a network management system.

20. The tangible and non-transitory machine-readable storage medium claimed in claim 11, wherein said instructions configure the operation of said network element such that said method further comprises:
determining that an outgoing message is associated with said probe session;
transmitting from said network element said outgoing message associated with said probe session; and
logging at said network element, a timestamp for transmission of said outgoing message along with said associated identifier for said probe session.

* * * * *